United States Patent [19]

Mayer

[11] 4,448,114
[45] May 15, 1984

[54] APPARATUS FOR PROCESSING FROZEN COMESTIBLES AND IN PARTICULAR TO AN IMPROVEMENT THEREIN

[75] Inventor: David Mayer, Scarsdale, N.Y.

[73] Assignee: Custom Creamery Systems, Inc., New York, N.Y.

[21] Appl. No.: 478,219

[22] Filed: Mar. 24, 1983

[51] Int. Cl.³ .................. A23G 9/02; A23G 9/04; A23G 9/12
[52] U.S. Cl. .................................. 99/494; 99/348; 222/413; 366/142; 366/196; 366/318; 425/200; 425/206; 426/519
[58] Field of Search .................. 99/348, 452, 494, 460, 99/517, 516; 426/518, 519; 425/206–209, 151, 200, 135, 182; 366/206, 140, 142, 247, 323, 194–196, 318; 222/413; 241/282.1

[56] References Cited

U.S. PATENT DOCUMENTS 2,626,133  1/1953  Reed .................................. 366/206
3,061,279  10/1962 Reed .................................. 222/413

Primary Examiner—Timothy F. Simone
Attorney, Agent, or Firm—Auslander & Thomas

[57] ABSTRACT

An apparatus for processing frozen comestibles has a cup for receiving a frozen comestible and a rotatable auger mounted for movement relative to the cup. The cup is moved to the auger to create a pocket in the frozen material in a first relative movement and mixes the frozen material with an added flavoring and extrudes the mixture from the cup in a second operation. A counter is provided which counts only the number of second operations of the apparatus.

3 Claims, 3 Drawing Figures

APPARATUS FOR PROCESSING FROZEN COMESTIBLES AND IN PARTICULAR TO AN IMPROVEMENT THEREIN

BACKGROUND OF THE INVENTION

The present invention relates to an apparatus for processing frozen comestibles and in particular to an improvement therein for the commercial use thereof.

Apparatus of this type are disclosed in U.S. Pat. Nos. 2,409,067; 2,676,132; 2,626,133 and 3,061,279. The description of the apparatus of the last-mentioned patent is incorporated herein by reference with regard to the details of the mechanism thereof.

SUMMARY OF THE INVENTION

The main object of the present invention is to provide an improvement therein to make the apparatus usable in commercial establishments where inventory control is desired and/or royalty fees are required to be calculated.

This, and other objects of the invention, are achieved in accordance with the invention by counting means which counts the number of times the apparatus is used to mix flavoring into frozen comestibles such as ice cream.

The apparatus has a cup for receiving a frozen comestible, rotatable auger means, means mounting the cup and auger means for relative movement toward and away from each other and a manually activatable arm for moving the auger means into and out of the cup in a first, relatively brief operation to create a pocket in the frozen comestible for the insertion of flavoring material and in a second, relatively longer operation to mix the frozen comestible and flavoring material and extrude the mixture from the cup. The counting means counts the number of second operations carried out by the apparatus.

The counting means includes means for distinguishing between the first and second operations and for counting only the second operation.

The distinguishing means comprises a timer. Since the first operation takes approximately 2-3 seconds and the second operation takes about 10 to 30 seconds, the timer has a duration of 4 seconds. The timer is started each time the arm is moved and the counter only increments when the arm is in the actuating position and the timer is expired. Thus, the counter only counts the second operation.

The apparatus also includes a key switch which allows the user to enable or disenable the counting means.

Although such novel feature or features believed to be characteristic of the invention are pointed out in the claims, the invention and the manner in which it may be carried out may be further understood by reference to the description following and the accompanying drawing, wherein:

DETAILED DESCRIPTION OF THE INVENTION

Figure 1:
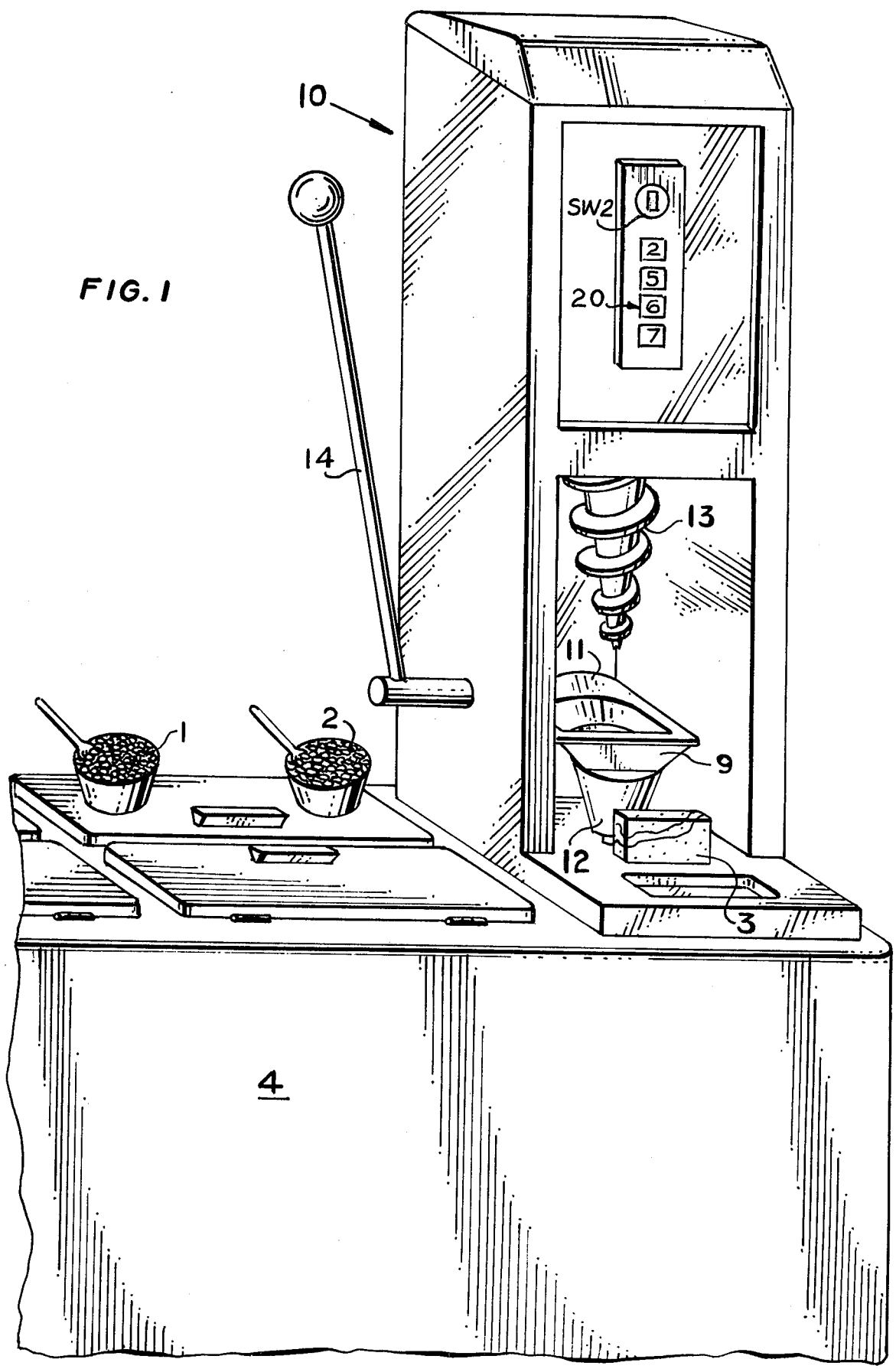
FIG. 1 is a perspective view of the apparatus according to the invention.

Referring now to the figures in greater detail, where like reference numbers denote like parts in the various figures.

The apparatus 10 includes steel cup 12 generally including a cup extender 9 on top of it. The cup 12 is raised to rotatable auger means 13 by the arm or handle 14. At a point where the auger means 13 substantially coincides to the contour of the cup 12, there is generally a stop. The consistency of the extruded substance is determined by a closeness of the auger 13 to the steel cup 12 where the steel cup 12 is in close contact with the mixture as extruded. Where there is more space, a harder mixture is extruded, and when the contents include pieces such as peanuts, then chunky pieces extruded are larger. The auger 13 fits very closely, right down to the point to the cup 12 which is cone shaped. The cup 12 is not closed, but ends in a star-shaped opening. The closed nature of the star is such that not much of anything is likely to drop out. The auger means 13 is hollow and when the arm 14 is at its point of lowest descent against the stop, the spring of the arm 14 or the spring of the shaft of the auger means 13 is actuated by the arm 14 to extend the shaft on which there is a small 3-prong chopper which fits intimately into the bottom of the cone of its cup 12 just adjacent to the star of the cone. The soft substance is then extruded and the star gives it a shape.

The cup 12 is held in an aluminum casting 11 with the cup extender 9 on top. The stainless steel cup 12, because of its nature, dissipates heat from the auger means 13 so that a soft frozen product is not melted, but is uniformly extrudable without becoming soupy.

The apparatus 10 sits on top of a freezer chest 4 wherein the bottom part of the cone of the cup 12 generally rests when not in use. This keeps the cone cool so that the ice cream itself is not overly melted when first put into the cup 12.

The primary procedures or first operation involves placing a brick or other portion of ice cream 3 into the cup 12, bringing the auger 13 partially into the cup 12 by partially depressing the arm 14 to form a pocket in the ice cream 3 for the placing of other substances, such as flavorings held in containers 1, 2 in the pocket formed by the auger 13. Flavoring may be peanuts, peanut brittle, frozen strawberries, frozen bananas, or other optional substances to be blended into the ice cream. Then the arm 14 is fully depressed in a second operation so that the blended mixture can be extruded.

The counting means 20 provided at the top of the apparatus 10 visually indicates the count of the number of the second operations performed. The counting means 20 is enabled and described by key switch SW2.

Figure 2:
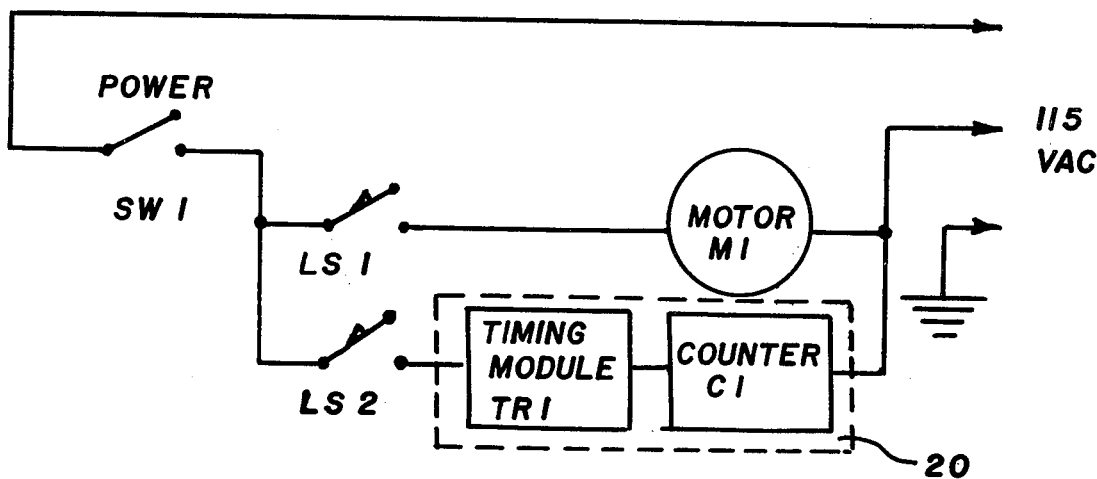
FIG. 2 is a schematic diagram of the pertinent portions of the electrical system of the apparatus.

FIG. 2 illustrates the electrical system of the apparatus pertinent to the timing means 20. The timing means 20 used is MDS 120A-3S from R-K Electric Company of Cincinnati, Ohio. In operation, the operator loads the cup 12 with the base product (ice cream 3) and pulls down the arm 14 to spread out the product along the side of the cup 12 to form a pocket. This operation takes less than 4 seconds, preferably about 2-3 seconds.

When arm 14 reaches a predetermined point in its travel, switches LS1 and LS2 will be mechanically closed, This in turn turns on the auger means 13 motor (not shown) and triggers the timing cycle of a 4 second timer module TR1.

Since the operator will release the arm 14 before 4 seconds are up, switches LS1 and LS2 will open, turn off the motor, and stop the timing cycle before the end of the 4 seconds. As a result, the counter C1 will not increment.

The operator then places the flavorings or ingredients into the pocket in the base product and again pulls down the arm 14 closing switches LS1 and LS2. The actual blending now takes place, which takes about 10 to 30 seconds to complete. Since the switch LS2 will be closed for more than 4 seconds, the timing module TR1 will increment counter C1 which will display the current count.

Figure 3:
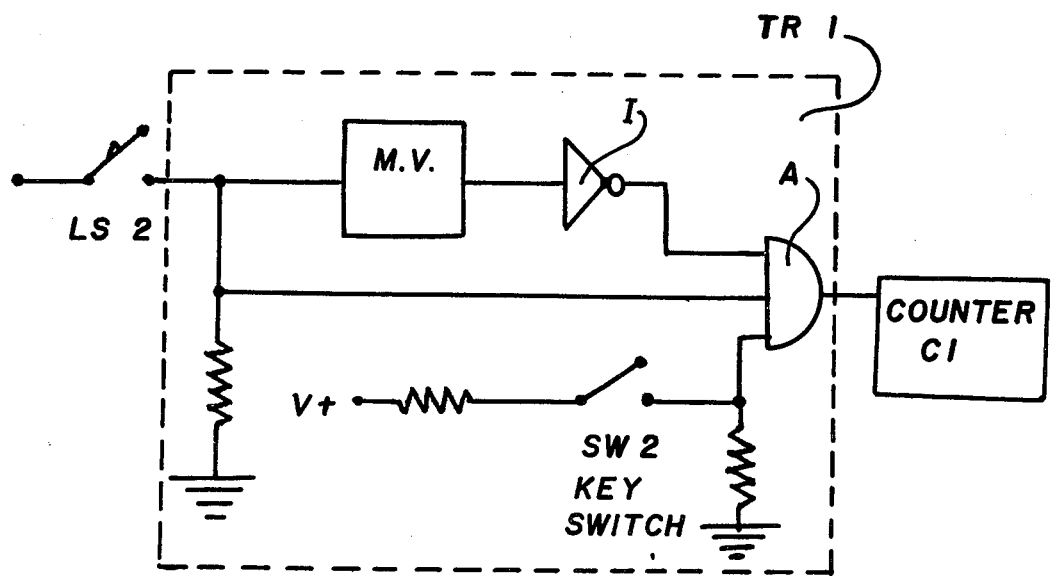
FIG. 3 is a schematic diagram of the timer module of the invention.

FIG. 3 shows a circuit for timing module TR1 of FIG. 2. The switch LS2 is connected to the input of a 4 second pulse monostable multivibrator MV whose output is inverted by inverter I and applied to an input of AND gate A together with the state of switch LS2 and key switch SW2. If switch SW2 is closed, gate A will produce a count pulse upon the end of the 4-second pulse from multivibrator MV. If switch LS2 is still closed (i.e. arm 14 is pulled down), the counter C1 will increment for each count pulse from AND gate A and will display the current count.

The terms and expressions which are employed are used as terms of description. It is recognized though, that various modifications are possible.

It is also understood that the following claims are intended to cover all of the generic and specific features of the invention herein described and all statements of the scope of the invention which, as a matter of language, might fall therebetween.

What is claimed is:

1. In an apparatus for processing frozen comestibles said apparatus having a cup for receiving a frozen comestible; rotatable auger means; means mounting said cup and auger means for related movement toward and away from each other; means adapted to actuate said related movement of said cup and auger and move said auger means into and out of said cup in a first related relatively brief movement; said first related movement adapted to create a pocket in a frozen comestible placed in said cup; said pocket adapted for the insertion of flavoring material; and in a second relatively longer related movement actuatable by said means adapted to actuate said related movement of said cup and auger to mix said frozen comestible and said flavoring material and extrude the mixture from said cup, the improvement comprising: means for counting the number of second related movements extruding said mixture, said counting means including means for distinguishing between said first and second related movements and for counting only the second related movements, said distinguishing means comprising a timer actuated by the related movements and having a duration greater than that of said first related movement and less than that of the second related movement, and said counting means only counting when the second related movement is actuated after the duration of the timer.

2. The apparatus according to claim 1, further comprising a key actuated switch for disenabling the counting means.

3. the invention of claim 1 wherein said counting means includes a switch means in series with said motor, a second switch means, in parallel with said first switch means, said second switch means including said timer and said counter both in series with said switch, and said switch means adapted to be simultaneously closed and opened.

* * * * *